US011511855B2

(12) United States Patent
Lu (10) Patent No.: US 11,511,855 B2
(45) Date of Patent: Nov. 29, 2022

(54) ORNITHOPTER AIRCRAFT (71) Applicant: Dongxiu Lu, Corona, CA (US)

(72) Inventor: Dongxiu Lu, Corona, CA (US)

( * ) Notice: Subject to any disclaimer, the term of this patent is extended or adjusted under 35 U.S.C. 154(b) by 30 days.

(21) Appl. No.: 17/208,852

(22) Filed: Mar. 22, 2021

(65) Prior Publication Data

US 2021/0331795 A1  Oct. 28, 2021

Related U.S. Application Data (60) Provisional application No. 63/013,670, filed on Apr. 22, 2020.

(51) Int. Cl.
*B64C 33/02* (2006.01)
*B64C 11/00* (2006.01)

(52) U.S. Cl.
CPC ............ *B64C 33/025* (2013.01); *B64C 11/00* (2013.01)

(58) Field of Classification Search
CPC . B64C 39/008; B64C 2201/162; B64C 27/20; B64C 2201/027
See application file for complete search history.

(56) References Cited

U.S. PATENT DOCUMENTS

| 1,366,016 | A | * | 1/1921 | Mosher | ................ | B64C 39/005 |
| | | | | | | 244/70 |
| 1,780,580 | A | * | 11/1930 | Davis | ................... | B64C 39/008 |
| | | | | | | 244/23 R |
| 1,793,387 | A | * | 2/1931 | Cornella | ............... | B64C 39/008 |
| | | | | | | 244/27 |
| 4,527,757 | A | * | 7/1985 | Gonzales | .............. | B64C 39/008 |
| | | | | | | 244/19 |
| 6,007,021 | A | * | 12/1999 | Tsepenyuk | .......... | B64C 29/0033 |
| | | | | | | 416/126 |
| 6,544,092 | B1 | | 4/2003 | Tomas | | |
| 6,769,949 | B2 | | 8/2004 | Kim et al. | | |
| 6,802,473 | B2 | | 10/2004 | Charron | | |
| 7,600,712 | B2 | | 10/2009 | Higham | | |
| 7,735,773 | B2 | * | 6/2010 | Schwaiger | .......... | B64C 29/0025 |
| | | | | | | 244/19 |
| 9,745,058 | B2 | | 8/2017 | Kuroda et al. | | |
| 10,814,967 | B2 | * | 10/2020 | Groninga | ................ | B64C 25/52 |
| 2014/0048657 | A1 | * | 2/2014 | Lin | ..................... | B64C 29/0025 |
| | | | | | | 244/23 A |
| 2021/0331795 | A1 | * | 10/2021 | Lu | ......................... | B64C 39/008 |

FOREIGN PATENT DOCUMENTS

FR  335279 A * 1/1904

* cited by examiner

*Primary Examiner* — Brian M O'Hara
(74) *Attorney, Agent, or Firm* — Clement Cheng (57) ABSTRACT

An ornithopter aircraft has a main body. A first wing frame mount and a second wing frame mount are mounted to the main body. A first wing frame is rotably mounted to a first wing frame axle on the first wing frame mount. The first wing frame is configured to rotate relative to the main body and the rotation can be powered. The first wing frame feathers are rotably mounted to the first wing frame at first feather axles and the first wing frame feather rotation can be powered. The first wing frame feathers are configured to rotate relative to the first wing frame and the first wing frame feather rotation can be powered. A second wing frame is configured to be rotably mounted to a second wing frame axle on the second wing frame mount.

12 Claims, 14 Drawing Sheets

ORNITHOPTER AIRCRAFT

The present invention claims priority from U.S. provisional application 63/013,670 filed Apr. 22, 2020 by same inventor Dongxiu LU, the disclosure of which is incorporated herein by reference.

FIELD OF THE INVENTION

The present invention is in the field of ornithopter aircraft.

DISCUSSION OF RELATED ART

An ornithopter is an aircraft that simulates bird wings flapping movement. Ornithopters are fascinating and educational. Feathers can be simulated with vanes in an ornithopter aircraft that can be made at a large or small scale. Ornithopter flight is very different than traditional fixed wing airplanes. Although some airplanes have a rotary wing, most vertical take off aircraft include rotary wing, helicopters and the like. Usually the ornithopter has a feathered flapping wing like a bird.

For example, in U.S. Pat. No. 6,544,092 entitled Toy Ornithopter Aircraft by inventor Eric Edward Tomas, published Apr. 8, 2003 the abstract discloses, "The fuselage or airframe is a solid, characterised as two-dimensional, plastic moulding. The flapping wings pivot at the inner ends both to a pin on the airframe. Connecting-rods go from the crankshaft to intermediate points on the wings. The various pivot connections are made by snapping resilient split sockets onto respective pins, so no tools or fasteners are needed. Designed thus, the aircraft can be manufactured in kit form, wherein all the required plastic components are formed together in a single injection, the components being detached for final assembly."

For example, in U.S. Pat. No. 6,769,949 entitled Power-Driven Ornithopter by inventor Seung-Woo Kim et al., published Aug. 3, 2004 the abstract discloses, "An ornithopter with an airframe structure that is lightweight, simple and stable and can generate sufficient lift and thrust. The ornithopter comprises a body, a main wing attached to an upper portion of a front section of the body, and a tail wing attached to a rear section of the body. The ornithopter further comprises a power source and a power transmission mechanism installed within a housing of the body. The main wing includes a wing frame composed of a plurality of frame rods and a skin attached to the wing frame for forming an outline of the main wing. The wing frame of the main wing is supported by a support means exposed to the outside at the upper portion of the front section of the body. The power transmission mechanism includes a gear train for adjusting the rotational motion of the power source at a proper speed and transferring it to the main wing, and connecting rods for converting the rotational motion into a swing motion of the main wing. Flight time of the ornithopter can be prolonged considering its weight and the power source can be easily manipulated."

Also for example, in U.S. Pat. No. 6,802,473 entitled Ornithopter With Flexible Fuselage by inventor Richard Charron, published Oct. 12, 2004 the abstract discloses, "An ornithopter has the capability of slow speed flight as a result of vertical movement of its wings. Two sets of wings are provided with vertical movement of each set of wings 180 degrees out of phase for counterbalancing vertical forces on the fuselage. The direction of the flight path is changed by deflecting the fuselage."

Also for example, in U.S. Pat. No. 7,600,712 entitled Ornithopter by inventor Thomas B. Higham, published Oct. 13, 2009 the abstract discloses, "An new ornithopter is provided with an elongated body, wings extending laterally from the forward end of the elongated body, and a tail extending laterally from the rear end of the elongated body. In one embodiment, an elongated rotatable member is rotatably coupled at one end to the forward end of the body, and a mass is connected to the other end of the elongated rotatable member. The elongated rotatable member and the mass are rotated to drive the ornithopter. In another embodiment, a mass is coupled to the forward end of the elongated body, and the mass is moved laterally from one side of the elongated body to the other side of the elongated body to drive the ornithopter. The mass may be imparted with rotational and/or translational movement."

Also for example, in U.S. Pat. No. 9,745,058 entitled Ornithopter by inventor Satoshi Kuroda, published Aug. 29, 2017 the abstract discloses, "An ornithopter includes a main wing mounted on a fuselage, and a control system configured to control a flapping motion of the main wing. The main wing includes an inner spar, an outer spar, and a wrist portion disposed between the inner spar and the outer spar and which varies a bending angle, which is a relative angle between the inner spar and the outer spar, within a predetermined angle range. The control system includes an actuator which performs a raising motion and a lowering motion of the inner spar by moving the inner spar in an upward direction and in a downward direction, an angle sensor which measures the bending angle, and a control unit which controls the actuator to move the inner spar in response to the measured bending angle."

SUMMARY OF THE INVENTION

A key feature of the present invention is the rotating feather members. The feather members are formed as long airfoil vanes that can be rectangular feather vanes. The feather members are movably mounted to wing frames, and the wing frames are movably mounted to the main body. Therefore, the feather members move relative to the wing frames, and the wing frames move relative to the main body. The coordination of movement between the feather members and the wing frames allows ornithopter flight.

An ornithopter aircraft has a main body. A first wing frame mount and a second wing frame mount are mounted to the main body. A first wing frame is rotably mounted to a first wing frame axle on the first wing frame mount. The first wing frame is configured to rotate relative to the main body and the rotation can be powered. The first wing frame feathers are rotably mounted to the first wing frame at first feather axles and the first wing frame feather rotation can be powered. The first wing frame feathers are configured to rotate relative to the first wing frame and the first wing frame feather rotation can be powered. A second wing frame is configured to be rotably mounted to a second wing frame axle on the second wing frame mount.

The second wing frame rotates relative to the main body. The second wing frame feathers are rotably mounted to the second wing frame at second feather axles. The second frame feathers rotate relative to the second wing frame. A propeller is horizontally mounted to the main body for providing horizontal movement to the main body. The first wing frame and the second wing frame are configured to rotate continuously in the opposite direction. The first wing frame has a first wing frame rotation. The second wing frame has a second wing frame rotation. The first wing frame rotation is opposite the second wing frame rotation.

The first wing frame feathers rotate in the opposite direction as the first wing frame, and the second wing frame feathers rotate in the opposite direction as the second wing frame. The first wing frame feathers rotate in the opposite direction as the first wing frame at half the speed of the first wing frame. The second wing frame feathers rotate in the opposite direction as the second wing frame at half the speed of the second wing frame. The first wing frame and the second wing frame are configured to reciprocate up and down in a downward power stroke followed by an upward recovery stroke.

An alternate embodiment of an ornithopter aircraft includes a main body. A first wing frame mount and a second wing frame mount are mounted to the main body. A first wing frame is rotably mounted to a first wing frame axle on the first wing frame mount. The first wing frame rotates relative to the main body. A first wing frame feather is mounted to a first wing frame conveyor belt. The first wing frame conveyor belt is mounted to the first wing frame. The first wing frame feathers rotate relative to the first wing frame along the first wing frame conveyor belt. A second wing frame is rotably mounted to a second wing frame axle on the second wing frame mount. The second wing frame rotates relative to the main body. A second wing frame feather is mounted to a second wing frame conveyor belt. The second wing frame conveyor belt is mounted to the second wing frame. The second wing frame feathers rotate relative to the second wing frame along the second wing frame conveyor belt.

The one or two propellers can be horizontally mounted to the main body for providing horizontal movement to the main body such as by push or pull. Preferably, the first wing frame feather and the second wing frame feather are half of the area of the first wing frame when in a deployed position. The first conveyor belt can be mounted to a first conveyor belt first roller and a first conveyor belt second roller, which are mounted to the first wing frame. The second conveyor belt is mounted to a second conveyor belt first roller and a second conveyor belt second roller, can be mounted to a second wing frame.

An alternate embodiment of an ornithopter aircraft further includes a main body with a first wing frame mount and a second wing frame mount mounted to the main body. A first wing frame rail is mounted to the first wing frame mount, and a second wing frame rail is mounted to the second wing frame mount. A first wing frame is slidingly mounted to the main body at the first wing frame rail. The first wing frame reciprocates and moves up and down relative to the main body. First wing frame feathers are rotably mounted to the first wing frame at first feather axles. The first wing frame feathers rotate relative to the first wing frame. A second wing frame is slidingly mounted to the main body at a second wing frame rail. The second wing frame moves up and down relative to the main body. Second wing frame feathers are rotably mounted to the second wing frame at second feather axles. The second wing frame feathers rotate relative to the second wing frame. The ornithopter aircraft have first wing frame feathers and second wing frame feathers that can overlap each other in a downward stroke, but rotate to an open position in an upward stroke.

The following call out list of elements can be a useful guide in referencing the element numbers of the drawings.
18 propeller
19 feather
20 main body
21 first wing frame
22 second wing frame
23 first wing frame feathers
24 second wing frame feathers
25 first wing frame axle
26 second wing frame axle
27 first wing frame mount
28 second wing frame mount
29 first feather axle
30 second feather axle
31 first propeller
32 second propeller
33 first feather rotation
34 second feather rotation
35 first wing rotation
36 second wing rotation
41 first wing conveyor belt
42 second wing conveyor belt
43 first wing frame feather attachment
44 second wing frame feather attachment
45 first conveyor belt first roller
46 first conveyor belt second roller
47 second conveyor belt first roller
48 second conveyor belt second roller
49 conveyor belt movement
51 first wing flap downstroke
52 second wing flap downstroke
53 first wing flap upstroke
54 second wing flap upstroke
61 downstroke flap
62 upstroke flap
63 vertical rail
64 vertical rail slot
65 first wing frame first vertical rail 66 first wing frame second vertical rail
67 second wing frame first vertical rail
68 second wing frame second vertical rail

DETAILED DESCRIPTION OF THE PREFERRED EMBODIMENT

As seen in FIGS. 1-4, a first embodiment of the ornithopter aircraft has a propeller 18 which can be a push or pull propeller, such as a first propeller 31 and a second propeller 32. The key feature of the invention a plurality of feathers 19 are mounted to a first wing frame 21 and a second wing frame 22, which in turn are mounted to a main body 20. The aircraft has a main body that may be formed as a fuselage having a pair of pusher or puller rotors attached to the main body for horizontal propulsion. The wings rotate and have a pair of vane sets. Each vane set has three vanes. Each wing has six vanes since each vane set has three vanes. The pair of wings has a total of twelve vanes. The vane sets rotate with the wing frame. On the downward stroke, the vanes rotate to a horizontal position to push air downwardly, and on the upward stroke, the vanes rotate to a more vertical position. The rotation of the vanes can be controlled by motors, or can be mechanically controlled.

The first wing frame feathers 23 are mounted to the first wing frame at first feather axles 29, and the second wing frame feathers 24 are mounted to the second wing frame at second feather axles 30. The first wing frame is mounted on a first wing frame axle 25 to the first wing frame mount 27 which is then mounted to the main body. The second wing frame is mounted on a second wing frame axle 26 to a second wing frame mount 28 which is then mounted to the main body. The first wing frame mount 27 and the second wing frame mount 28 can be formed as a pair of horizontally extending cantilevers.

The first feather rotation 33 rotates on the first wing in the opposite direction as the first wing rotation 35, and the second feather rotation 34 rotates on the second wing in the opposite direction as the second wing rotation 36. The first wing frame and second wing frame rotate in a coordinated, balanced, symmetrical and opposing motion. The first wing frame rotates in a clockwise motion, and the second wing frame rotates in a counterclockwise motion. The first feather rotation is likewise generally symmetrical to the second feather rotation as both present a horizontal orientation on the downstroke and a vertical orientation on the upstroke. The vertical orientation on the upstroke allows minimal drag. Thus, the feather rotation is 90° for a 1800 rotation of the frame. Thus, the feather rotation rate is generally half the frame rotation rate. Electronic controls with feedback can vary this general rotation rate ratio of one half feather rotation rate to frame rotation rate based upon specific conditions. The feather rotation rate can be electronically controlled by servomotors. The feather can rotate in a direction opposite the rotation of the main frame.

Figure 1:
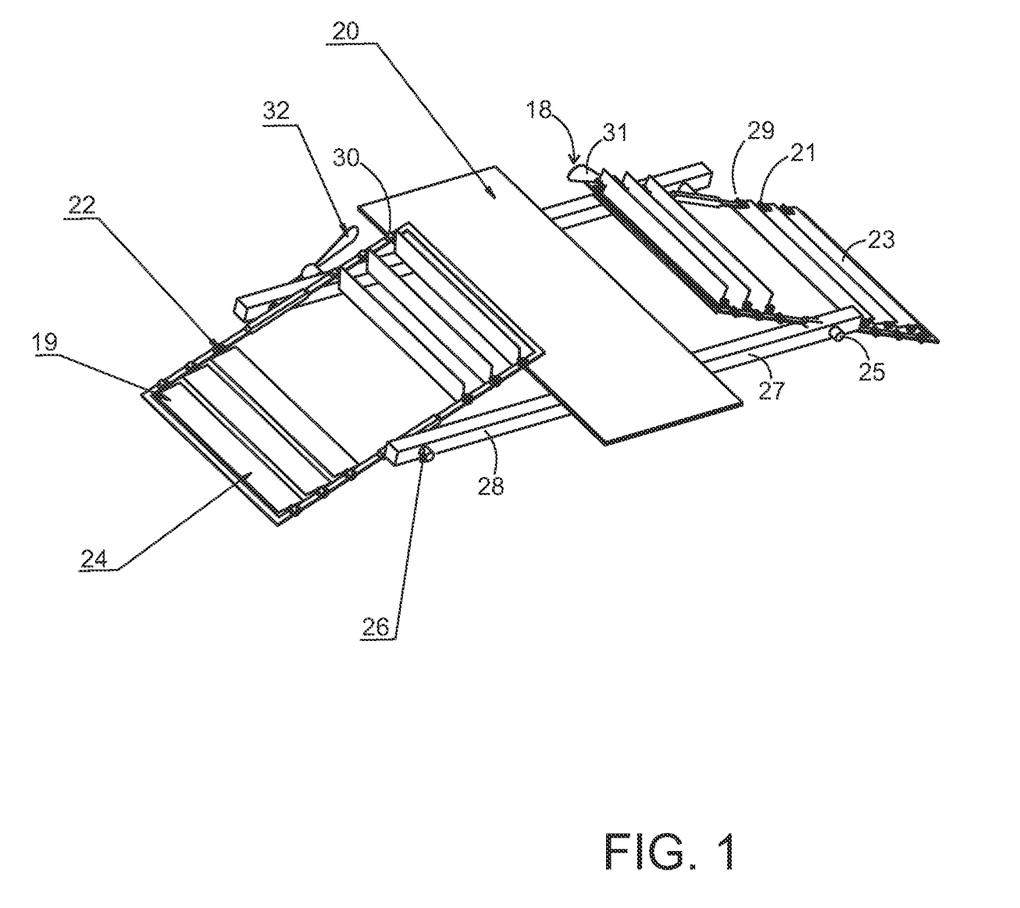
FIG. 1 is a perspective view diagram of a rotating wing with rotating feather vane configuration.
Figure 2:
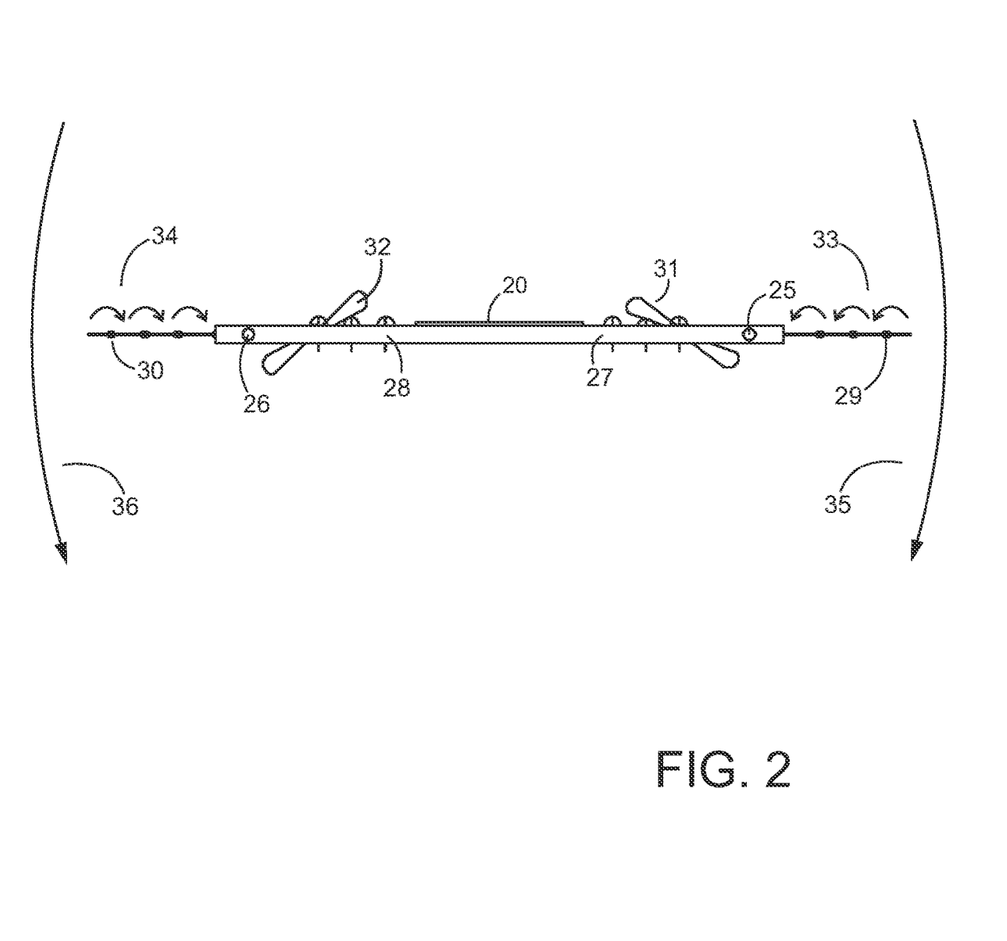
FIG. 2 is a back side view of the rotating wing with rotating feather vane configuration during a downward stroke.
Figure 3:
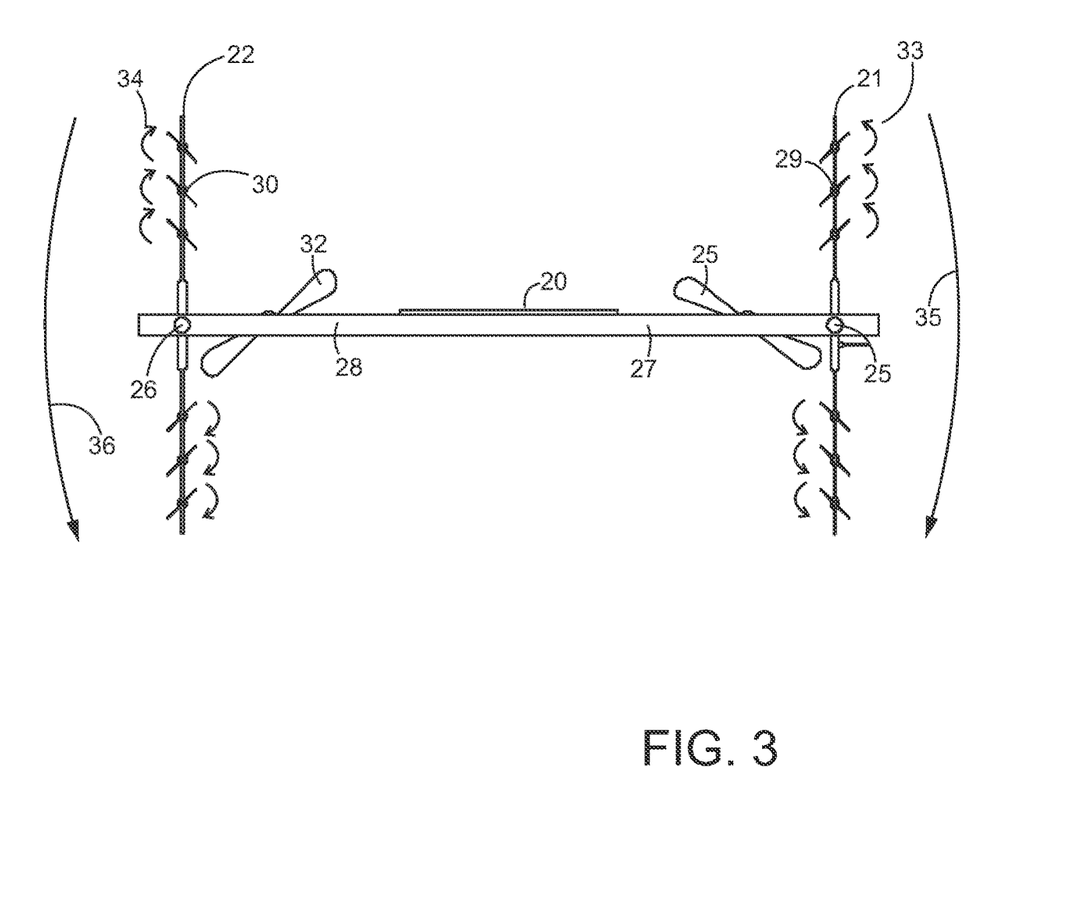
FIG. 3 is a back side view of the rotating wing with rotating feather vane configuration during a recovery stroke.
Figure 4:
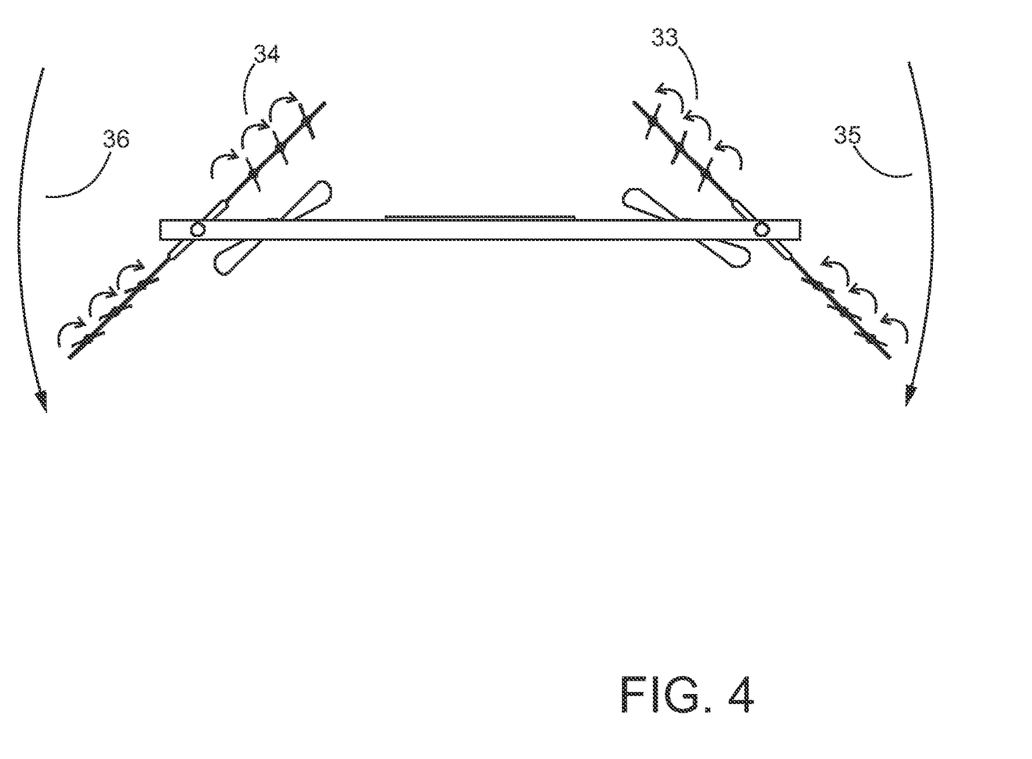
FIG. 4 is a back side view of the rotating wing with rotating feather vane configuration during a downward stroke.
Figure 5:
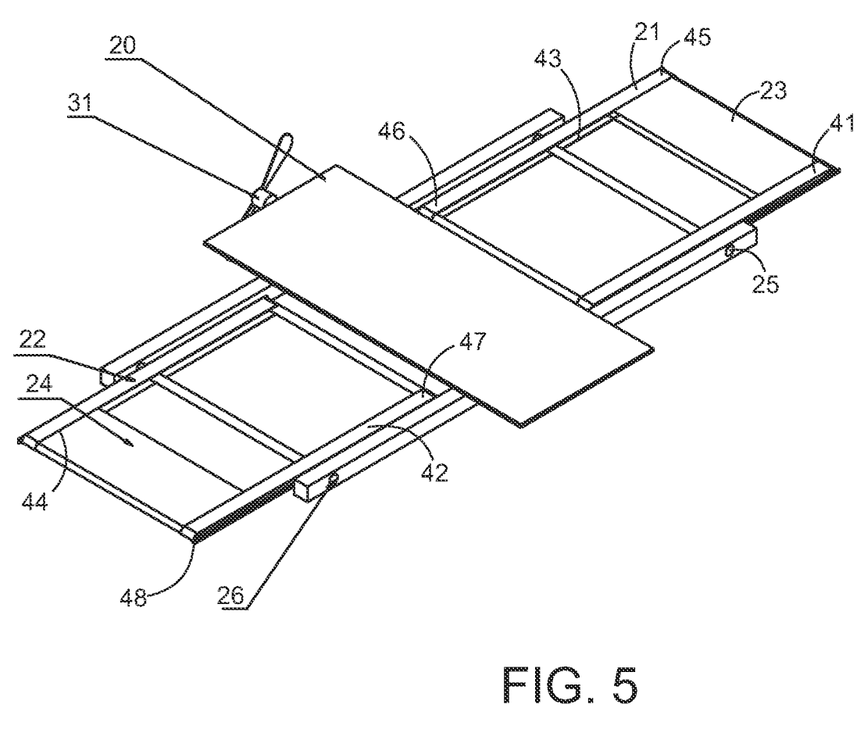
FIG. 5 is a perspective view diagram of a rotating wing with conveyor belt feather vane configuration.

As seen in FIG. 2, the aircraft has a wing configuration with a downward wing stroke on the distal ends of the pair of wings. As seen in FIG. 3, the aircraft has a position where the wings are vertically oriented. As seen in FIG. 4, the aircraft has a wing configuration with a downward stroke orientation that generates lift.

The rotary shaft can be formed as a pair of separate pieces which are coaxial and parallel to each other. The rotary shaft is mounted to the wing frame. The left and right wing frames are preferably symmetrical. The left and right wing frames preferably rotate on their respective left and right rotation axis (left counterclockwise and right clockwise), and the feathers also rotate at the same time in an opposite direction. Taking the left part as an example, when the wing frame rotates one circle, the feather piece rotates for half a cycle, that is, the speed is half of the rotation speed of the wing frame. The feather piece is also symmetrical between their left and right parts, but the left and right feather pieces can remain vertical when retracting. When the wing shelf is parallel to the rack, the left feather piece on the left wing shelf is parallel to the wing shelf, and the feather piece has the largest area of effect on the air when it is turned downward.

The force is the largest, the feather on the right is perpendicular to the wing shelf, and the area of the feather on the air is the smallest when it rotates upward in a retracting recovery motion. Having a vertical configuration allows minimal force of the air. When the wing shelf is perpendicular to the frame, feather vanes on the wing frame can be at an angle of 45° to the wing frame. Typically, when the area of action on the air is the same, the force will be the same.

The wing frame flaps such as by rotation. During rotation, the left feather on the air can be greater than that on the right, which produces upward lift and the rotation of the wing shelf. The feathers can be mounted on servomotors that control the movement of each feather independently. Also, the left and right wing frames can be mounted on servomotors that control the movement of each left and right wing frame independently.

Figure 6:
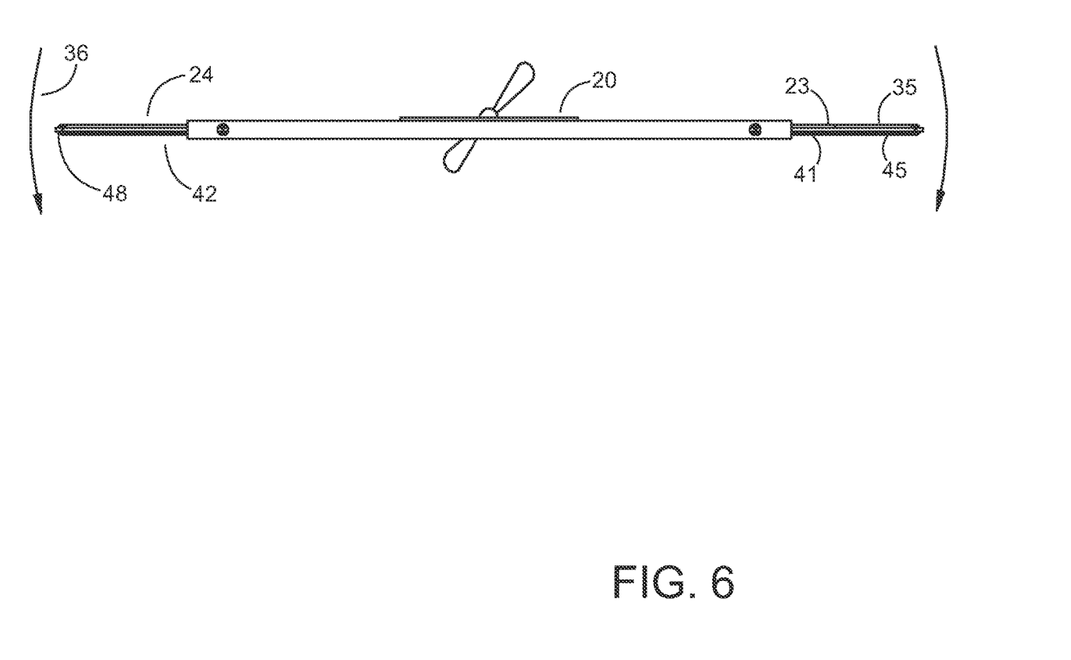
FIG. 6 is a back side view of the rotating wing with conveyor belt feather vane configuration.
Figure 7:
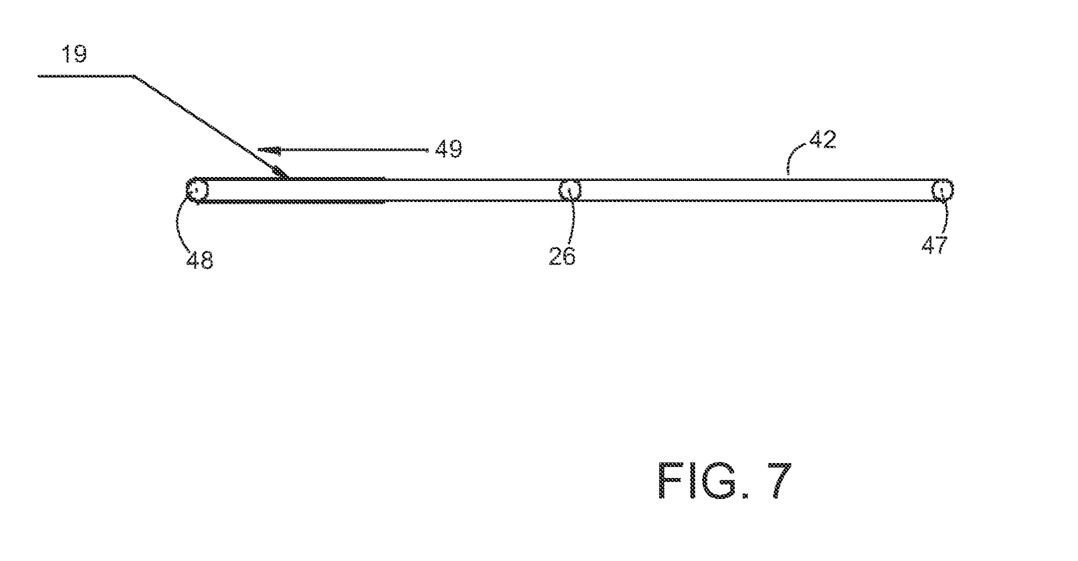
FIG. 7 is a diagram showing the conveyor belt motion in a downward stroke.
Figure 8:
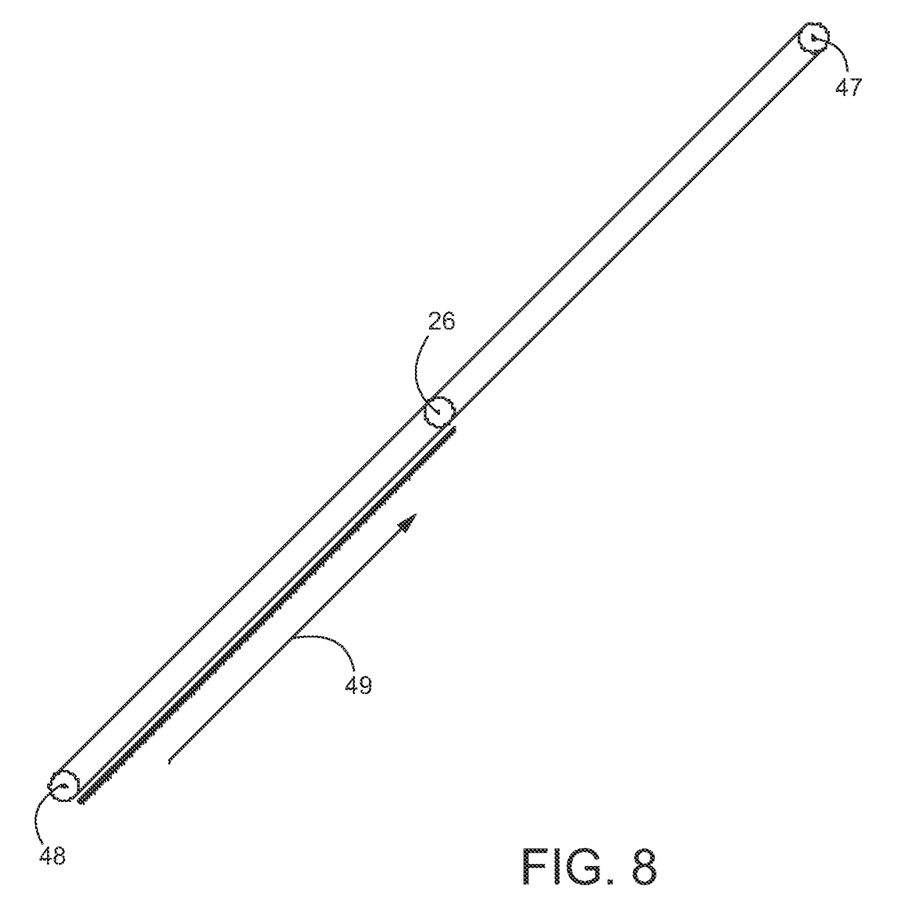
FIG. 8 is a diagram showing the conveyor belt motion in ending a downward stroke.
Figure 9:
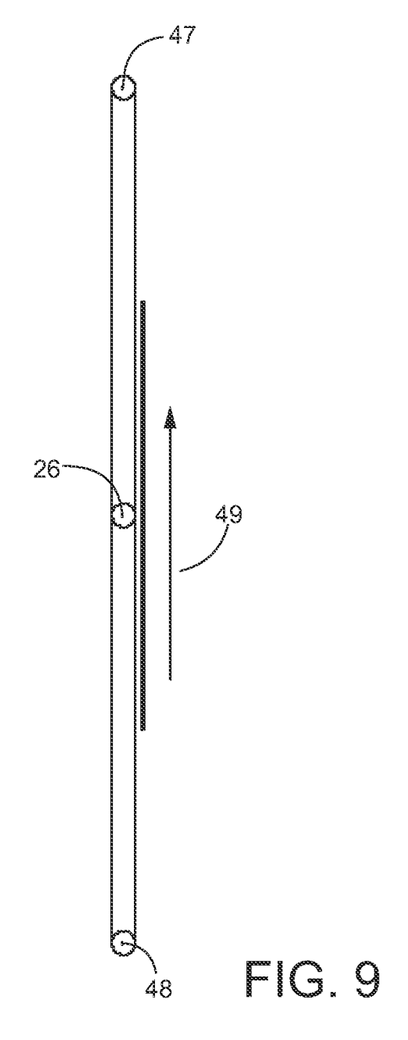
FIG. 9 is a diagram showing the conveyor belt motion in a recovery stroke.
Figure 10:
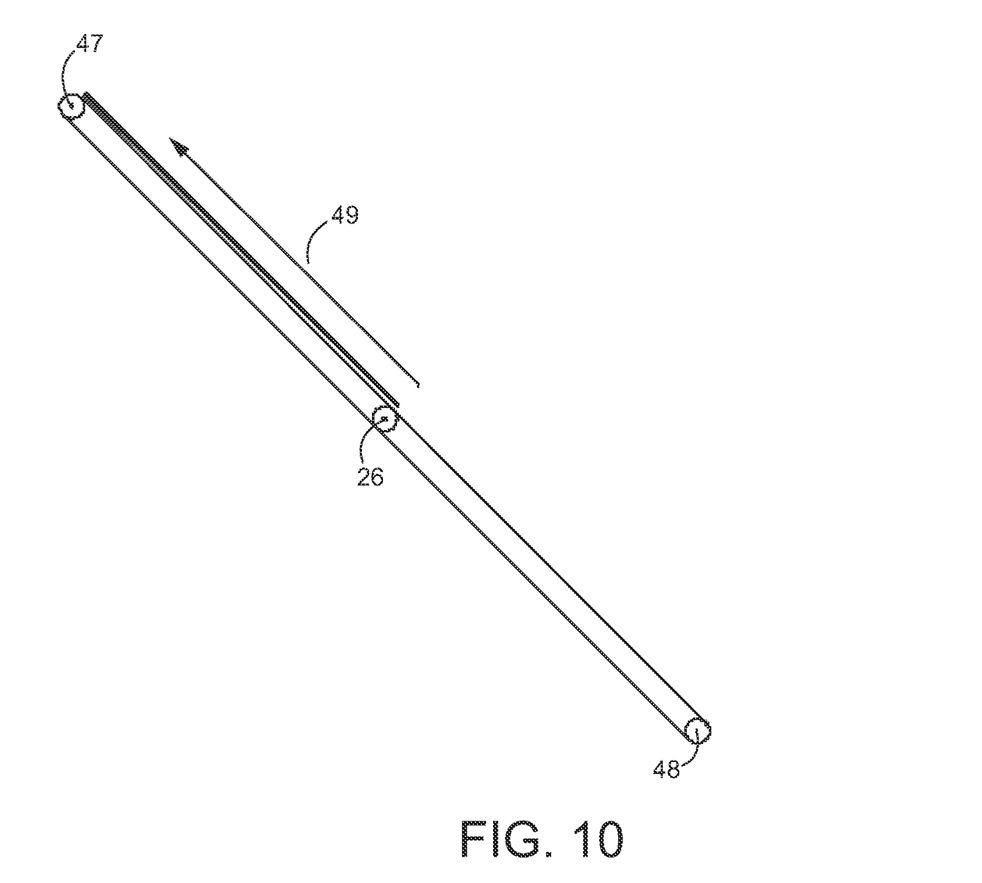
FIG. 10 is a diagram showing the conveyor belt motion in a beginning of a downward stroke.

As seen in FIGS. 5-10, a second embodiment of the present invention involves a movable soft flap or board. A single vane on each wing is sufficient for this configuration. The vane can be rigid or flexible. As seen in FIG. 6 the downward stroke has horizontally oriented flat vanes presenting a generally flat continuous surface for generating lift. As seen in FIG. 7, the vane can be formed as a flap which can be a rolling soft board that moves according to gravity and wind drag or can be powered. The rolling soft board could be mounted on a conveyor belt that is timed to synchronize with the rotation of the wing frame. The conveyor belt can have an airfoil portion and an open portion so that airflow passes through the open portion when the open portion is on the upstroke, and the airflow is pushed downwardly by the airfoil portion when the airfoil portion is on the downstroke. Optionally, the conveyor belt can be geared to the axle of the wing frame so that the conveyor belt motion and the wing frame motion are mechanically connected. Of course, over time, if it is only a simple fixed geared connection, there may be a migration of the position of the airfoil portion. Therefore, an adjustment mechanism is included for shifting the conveyor belt position and the conveyor belt timing. The adjustment mechanism can provide for different lift and flight qualities.

In this way, an ornithopter can have an airfoil that has a flapping motion by being mounted to a moving conveyor belt on a rotating wing frame. The pair of rotating wing frames must be balanced as in avian bird flight and an electronic controller is highly preferred for implementing the airfoil conveyor belt rotating wing frame ornithopter mechanism.

The first wing frame has a first wing conveyor belt 41, and the second wing frame has a second wing conveyor belt 42. The first wing conveyor belt 41 has a first wing frame feather attachment 43 to a first wing frame feather, and the second wing frame feather attachment 44 has a second wing frame feather to a second wing frame feather. The first wing conveyor belt 41 is mounted on the first conveyor belt first roller 45 and the first conveyor belt second roller 46. The second conveyor belt is mounted on the second conveyor belt first roller 47 and the second conveyor belt second roller 48. A conveyor belt movement 49 rotates in the same direction as the wing frame it is mounted on. The conveyor belt movement 49 on the first wing frame is clockwise when the first wing frame is moving in a clockwise direction. The conveyor belt movement 49 on the second wing frame is counterclockwise when the second wing frame is moving in a counterclockwise direction.

The left and right portions of the wing frame are symmetrically mounted to the main body which can be formed as a fuselage. The left and right wing frames rotate on the left and right rotation axis (left counterclockwise and right clockwise). Taking the left wing, or left wing frame as an example, the left wing rotates with a flexible board that rolls to the left, and when the flexible board wing shelf turns to be parallel to the rack, the rolling flexible board rolls up and down. Preferably, the airfoil area is at least a quarter of the entire wing frame profile with other areas being empty. Which in this case the left side has a larger area of air impact than the right side. When the wing frame turns to an angle of 45°, the rolling soft board on the left occupies half of the entire wing board, with the right side being empty, and the left side having a larger area of air impact than the right side. Thus, by rolling the airlifting area on the conveyor belt, the airlifting area changes the ratio of lift to non-lifting area of the wing frame.

When the wing frame rotates to 90°, the rolling soft board is bounded by the central axis. The area occupied by the upper and lower sides are the same. As the left wing frame keeps rotating, the area on the left is always greater than the right, and the force on the air is always greater than the right which continues to produce an upward lift. To provide tilt, the speed of conveyor belt rotation or movement can be electronically controlled so that it is not constant, thereby providing differential between the left and right sides. If the right side generates more lift, the aircraft can tilt to the left. Similarly, if the left side generates more left, the aircraft can tilt to the right.

Figure 11:
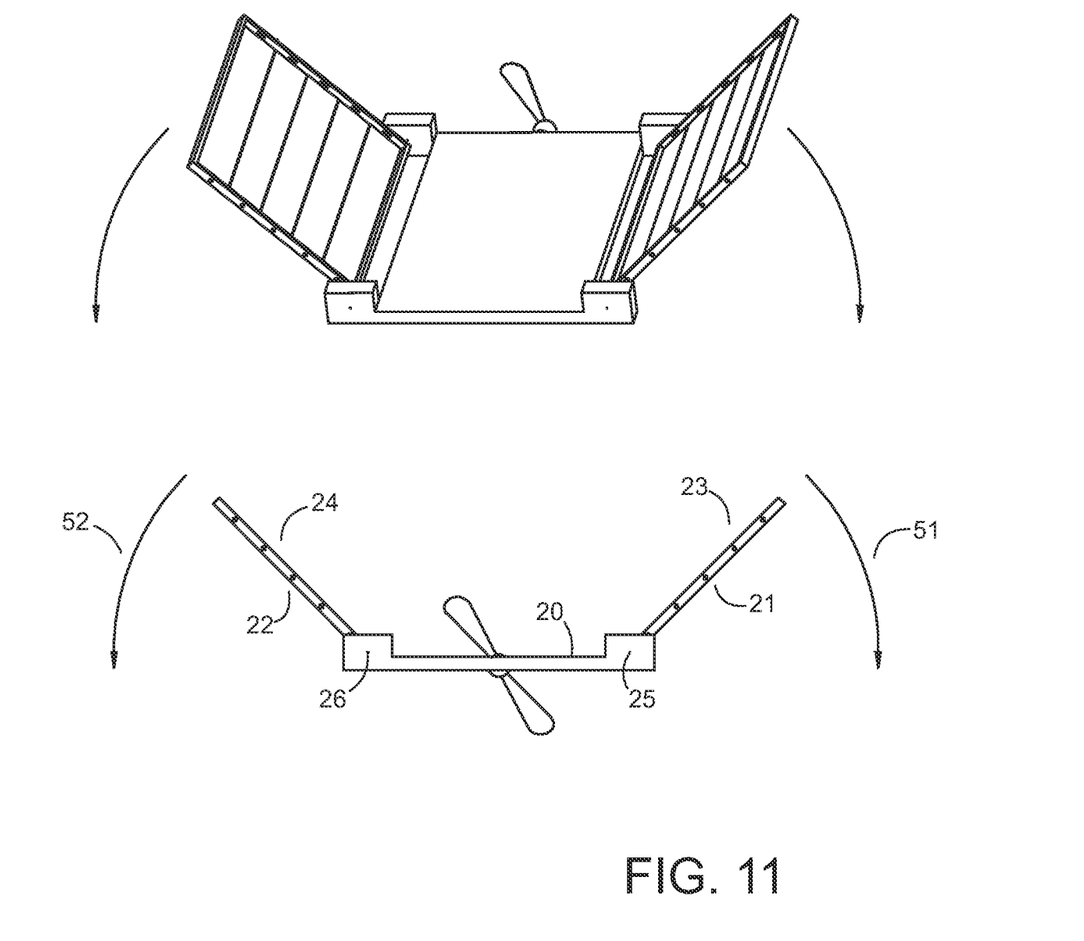
FIG. 11 is a diagram showing a reciprocal pivotal flapping configuration in a downward stroke.
Figure 12:
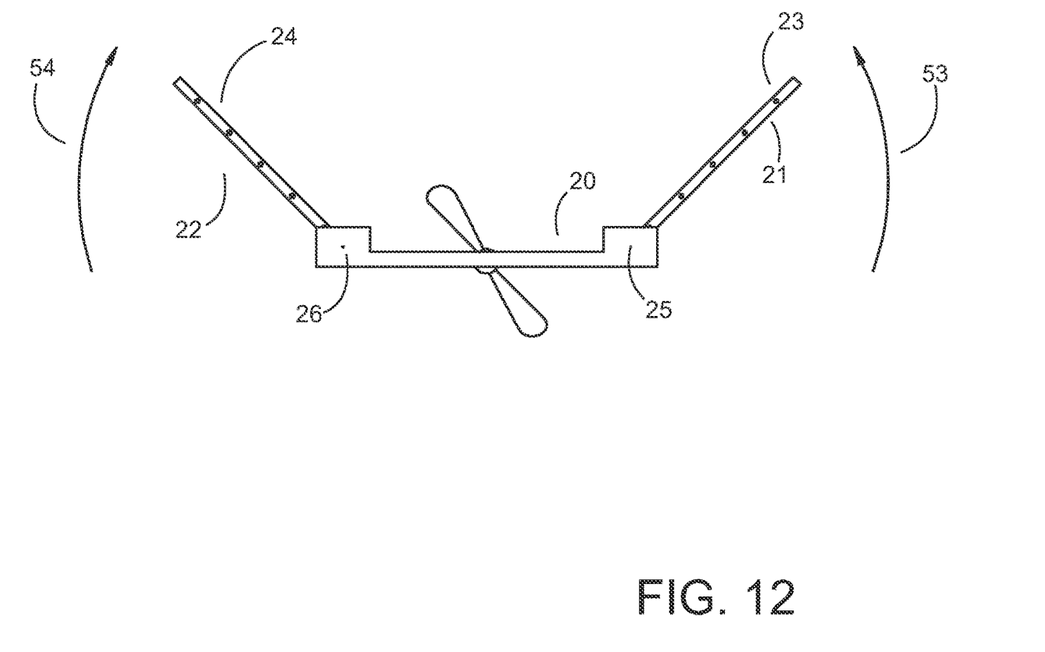
FIG. 12 is a diagram showing a reciprocal pivotal flapping configuration in an upward stroke.

As seen in FIGS. 11-12, the third embodiment of the present invention is an ornithopter configuration with a reciprocating wing flapping configuration similar to a bird wing. As in the previous embodiments, the vanes are parallel with airflow on an upstroke and perpendicular with airflow on a downstroke. This embodiment makes the apparatus appear more like a bird and is particularly well-suited for toy gliders, kites or the like.

The first wing flap downstroke 51 is coordinated with the second wing flap downstroke 52. Similarly, the first wing flap upstroke 53 is coordinated with the second wing flap upstroke 54. The first embodiment can be modified to become the third embodiment by having reciprocating rotation rather than continuous rotation of the wing frames. When the wing frames have reciprocating rotation, the feathers preferably also have reciprocating movement rather than rotational movement. The feathers need not be powered in the third embodiment.

The third embodiment is the most birdlike configuration. The feather pieces open and close similar to a bird in flight. When the wing frame is inclining downwardly, such as when the feather members are parallel to the wing frame, the feather pieces cooperate and close together to interlock to make a continuous wing. By providing downward force of air, the aircraft rises. When the wings frame retracts upwardly, the feathers spread out such that the feathers are perpendicular to the wing frame until they move downwardly at which point the feathers merge again. Through reciprocating flapping action, the net downward force is sufficient to lift the entire aircraft. At the same time, the horizontal driving propellers can rotate to provide forward force, so that the aircraft can rise and fly forward at the same time.

Figure 13:
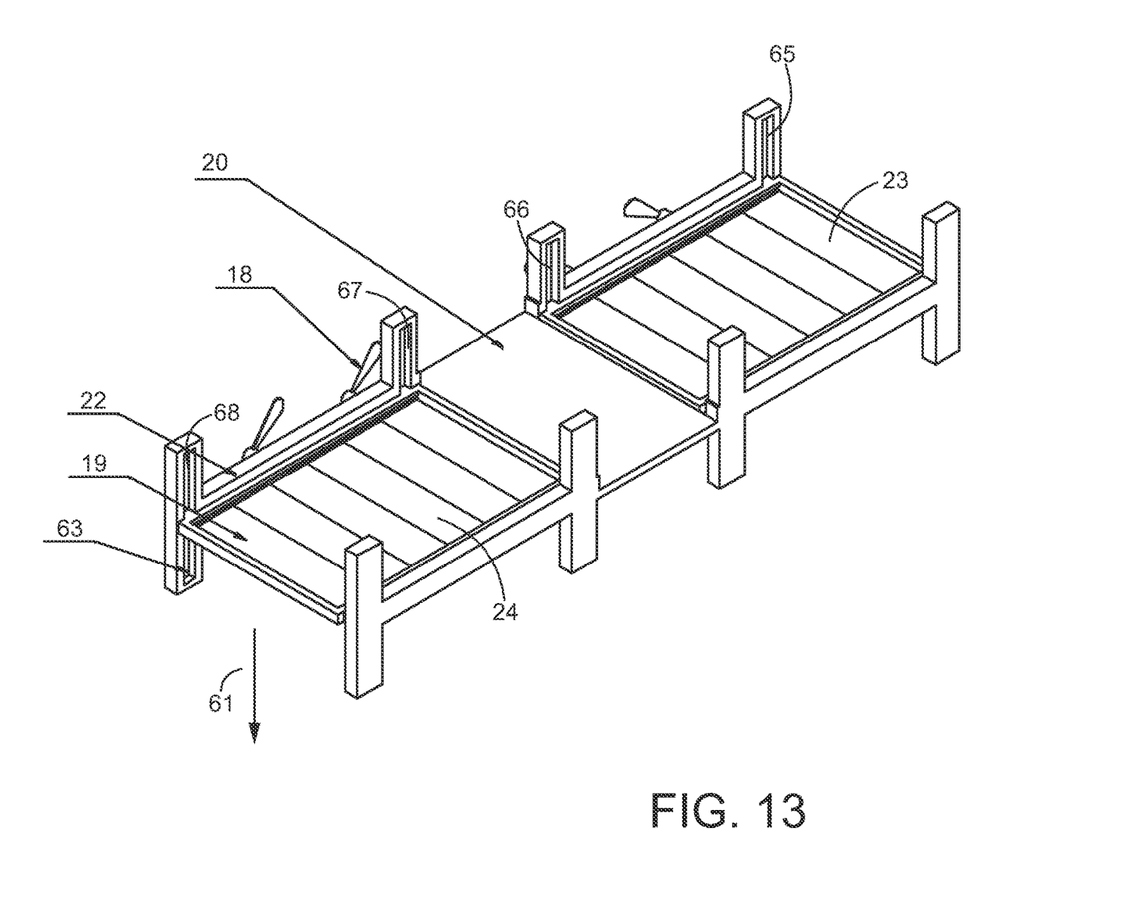
FIG. 13 is a diagram showing a reciprocal linear flapping configuration in a downward stroke.
Figure 14:
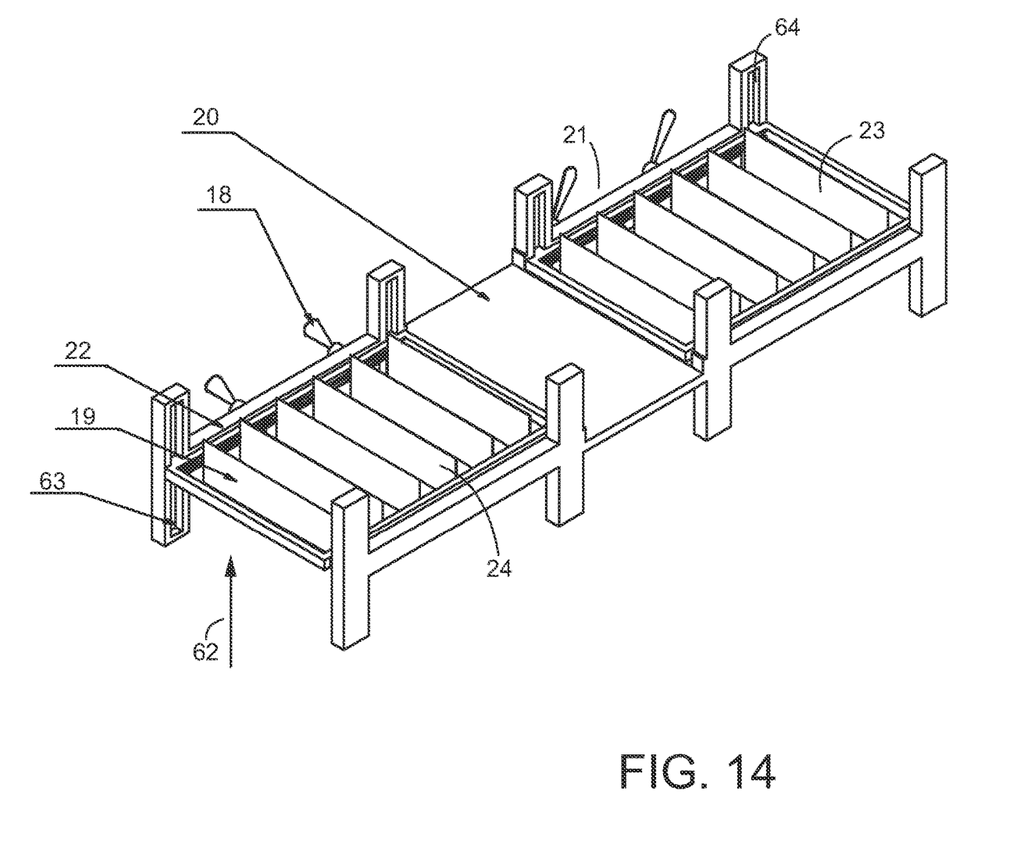
FIG. 14 is a diagram showing a reciprocal linear flapping configuration in an upward stroke.

As seen in FIGS. 13-14, the fourth embodiment of the present invention is a modification of the third embodiment of the present invention such that the downstroke flap 61 and upstroke flap 62 are reciprocating in a linear fashion. The linear reciprocation motion is on a vertical rail 63 having a vertical rail slot 64. Generally, the first wing frame first vertical rail 65 and first wing frame second vertical rail 66 support the first wing frame in an up-and-down motion. Similarly, the second wing frame first vertical rail 67 and the second wing frame second vertical rail 68 support the second wing frame in an up-and-down motion.

The airfoil feathers can also be mounted on a pair of elevators which reciprocate in and up and down manner vertically like a car lift where the elevators are connected to vertical slots. The up-and-down motion also is a flapping motion that allows for ornithopter flapping. With each upstroke, the airfoil is rotated vertically and then with each downstroke, the airfoil is rotated horizontally to provide a continuously interlinked series of airfoil feathers that form a wing for providing lift. The rails may have slots that are vertical, or oval-shaped slots. The wings can move up and down in the oval track instead of a vertical slot.

The ornithopter vane configuration preferably includes computer controller for stability. The ornithopter may have three or four sets of wings to provide an ornithopter configuration that is similar in control to a quad copter for multi rotor aircraft. By selectively controlling each airfoil feather, the electronic controller can provide vertical flight similar to a multi rotor. The present invention thus provides a multi rotor functionality while maintaining an ornithopter configuration. The ornithopter configuration may be useful for providing an ultralight configuration where the flapping is slow, such as one cycle per five seconds.

An electronic controller mounted in the fuselage can provide for multi rotor functionality.

The invention claimed is:

1. An ornithopter aircraft comprising:
  a. a main body;
  b. a first wing frame mount and a second wing frame mount mounted to the main body;
  c. a first wing frame rotably mounted to a first wing frame axle on the first wing frame mount, wherein the first wing frame rotates relative to the main body wherein the first wing frame rotates continuously 360 degrees in only one direction on the first wing frame axle when in operation;
  d. first wing frame feathers rotably mounted to the first wing frame at first feather axles, wherein the first wing frame feathers rotate relative to the first wing frame, wherein the first wing frame feathers rotate continuously 360 degrees in only one direction on the first feather axles when in operation;
  e. a second wing frame rotably mounted to a second wing frame axle on the second wing frame mount, wherein the second wing frame rotates relative to the main body when in operation, wherein the second wing frame rotates continuously 360 degrees in only one direction on the second wing frame axle when in operation; and
  f. second wing frame feathers rotably mounted to the second wing frame at second feather axles, wherein the second wing frame feathers rotate relative to the second wing frame, wherein the second wing frame feathers rotate continuously 360 degrees in only one direction on the second feather axles when in operation.

2. The ornithopter aircraft of claim 1, further comprising a propeller horizontally mounted to the main body for providing horizontal movement to the main body.

3. The ornithopter aircraft of claim 1, wherein the first wing frame and the second wing frame are configured to rotate continuously in only one direction, wherein the first wing frame has a first wing frame rotation, wherein the second wing frame has a second wing frame rotation, wherein the first wing frame rotation is opposite the second wing frame rotation.

4. The ornithopter aircraft of claim 3, wherein the first wing frame feathers rotate in only one direction in the opposite direction as the first wing frame, and wherein the second wing frame feathers rotate in only one direction which is opposite the second wing frame, such that if the first wing frame is rotating clockwise, then the first wing frame feathers are rotating counterclockwise and such that if the second wing frame is rotating clockwise, then the second wing frame feathers are rotating counterclockwise.

5. The ornithopter aircraft of claim 4, wherein the first wing frame feathers rotate in the opposite direction as the first wing frame at half the speed of the first wing frame, and wherein the second wing frame feathers rotate in the opposite direction as the second wing frame at half the speed of the second wing frame.

6. An ornithopter aircraft comprising:
a. a main body;
b. a first wing frame mount and a second wing frame mount mounted to the main body;
c. a first wing frame rotably mounted to a first wing frame axle on the first wing frame mount, wherein the first wing frame rotates relative to the main body;
d. a first wing frame feather mounted to a first wing frame conveyor belt, wherein the first wing frame conveyor belt is mounted to the first wing frame, wherein the first wing frame feather rotates relative to the first wing frame along the first wing frame conveyor belt, wherein the first wing frame feather is formed as a rolling soft board of conveyor belt material;
e. a second wing frame rotably mounted to a second wing frame axle on the second wing frame mount, wherein the second wing frame rotates relative to the main body; and
f. a second wing frame feather mounted to a second wing frame conveyor belt, wherein the second wing frame conveyor belt is mounted to the second wing frame, wherein the second wing frame feathers rotate relative to the second wing frame along the second wing frame conveyor belt, wherein the second wing frame feather is formed as a rolling soft board of conveyor belt material.

7. The ornithopter aircraft of claim 6, further comprising a propeller horizontally mounted to the main body for providing horizontal movement to the main body.

8. The ornithopter aircraft of claim 6, wherein the first wing frame feather and the second wing frame feather are half of the area of the first wing frame when in a deployed position.

9. The ornithopter aircraft of claim 6, Wherein the first conveyor belt is mounted to a first conveyor belt first roller and a first conveyor belt second roller, which are mounted to the first wing frame, wherein the second conveyor belt is mounted to a second conveyor belt first roller and a second conveyor belt second roller, which are mounted to a second wing frame.

10. An ornithopter aircraft comprising:
a. a main body;
b. a first wing frame mount and a second wing frame mount mounted to the main body;
c. a first wing frame rail mounted to the first wing frame mount, and a second wing frame rail mounted to the second wing frame mount;
d. a first wing frame slidingly mounted to the main body at the first wing frame rail, wherein the first wing frame moves up and down relative to the main body in linear reciprocation when in operation;
e. first wing frame feathers rotably mounted to the first wing frame at first feather axles, wherein the first wing frame feathers rotate relative to the first wing frame;
f. a second wing frame slidingly mounted to the main body at a second wing frame rail, wherein the second wing frame moves up and down relative to the main body in linear reciprocation when in operation; and
g. second wing frame feathers rotably mounted to the second wing frame at second feather axles, wherein the second wing frame feathers rotate relative to the second wing frame.

11. The ornithopter aircraft of claim 10, further comprising a propeller horizontally mounted to the main body for providing horizontal movement to the main body.

12. The ornithopter aircraft of claim 10, wherein the first wing frame feathers and the second wing frame feathers overlap each other in a downward stroke, but rotate to an open position in an upward stroke.

* * * * *